March 7, 1944. F. ROGERS 2,343,583
HARVESTING MACHINE
Filed June 13, 1942 5 Sheets-Sheet 2
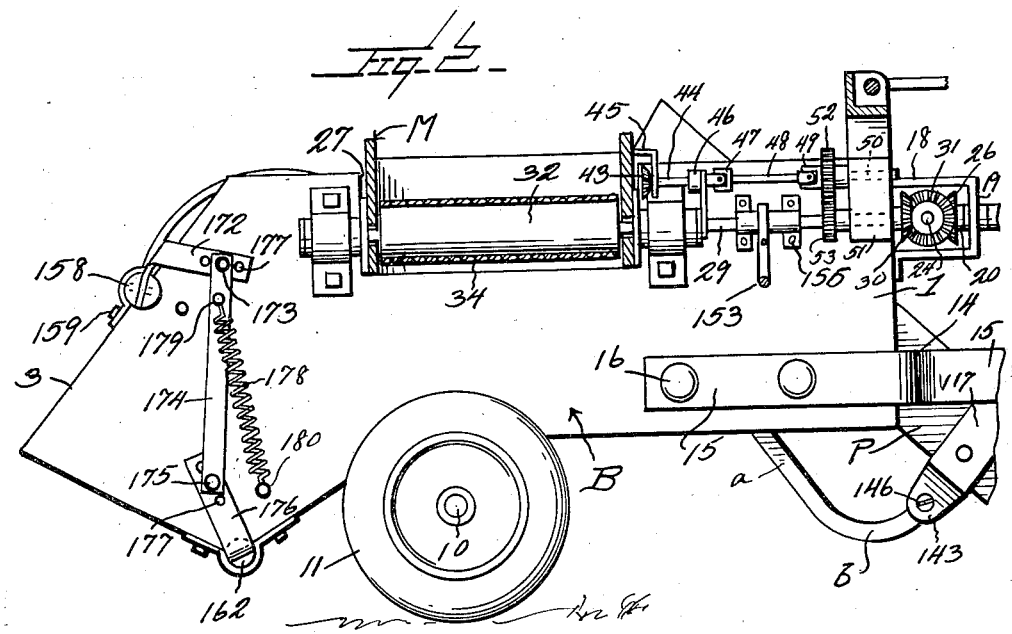
Fig. 2.
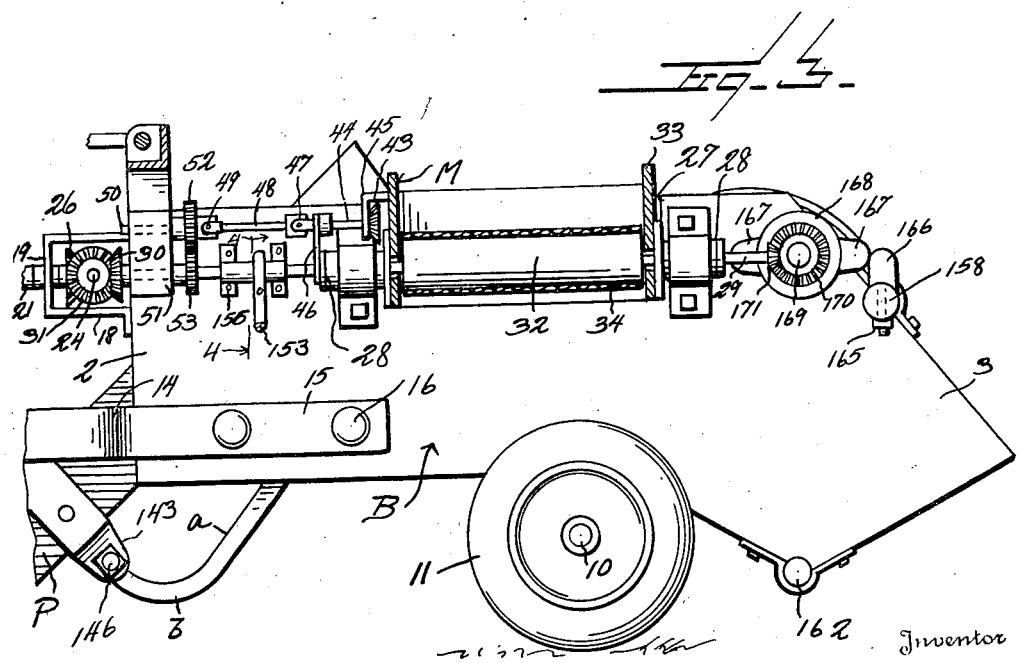
Fig. 3.
Fig. 4.
Inventor
Frank Rogers
By Coleman & Lawson
Attorneys

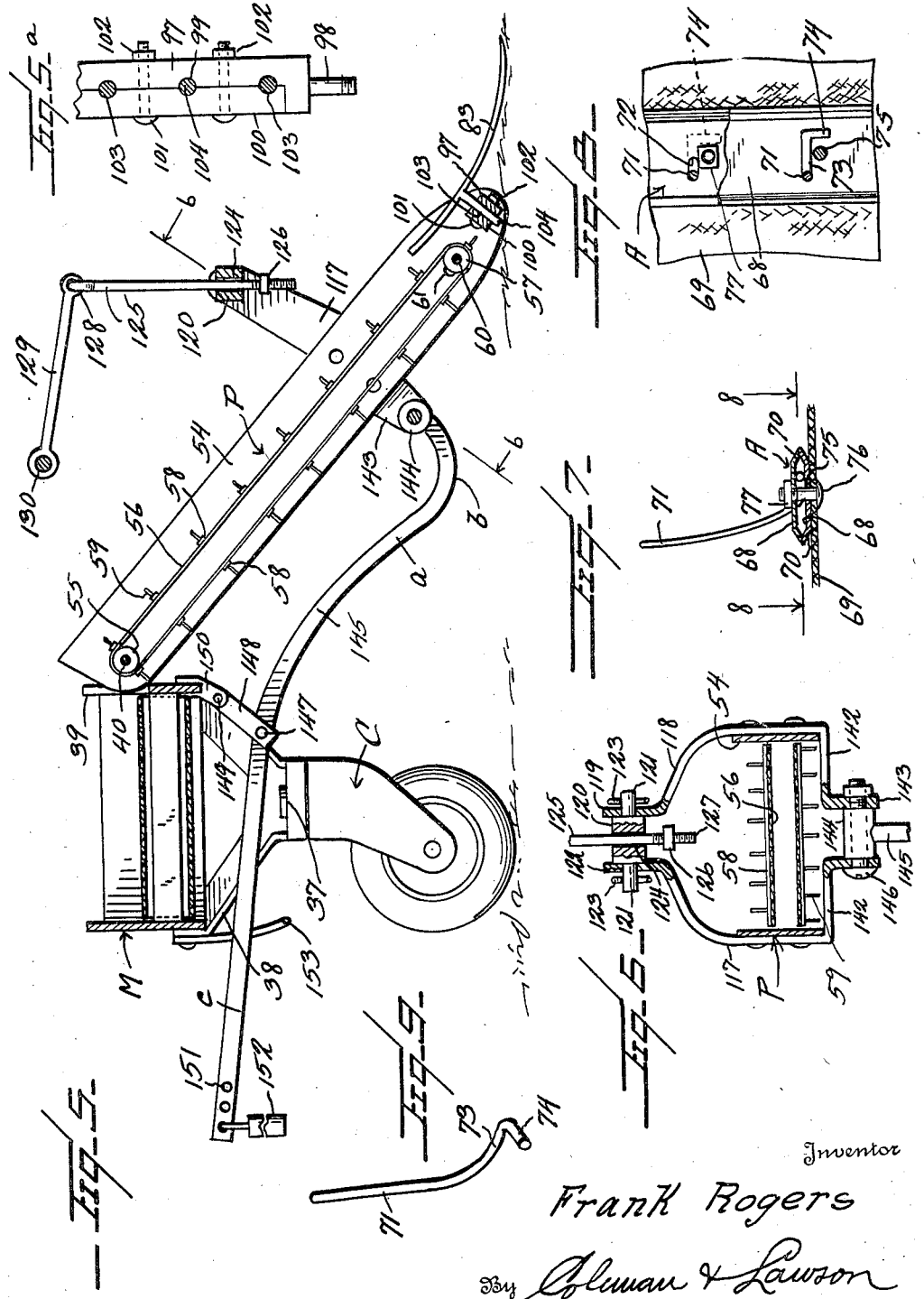

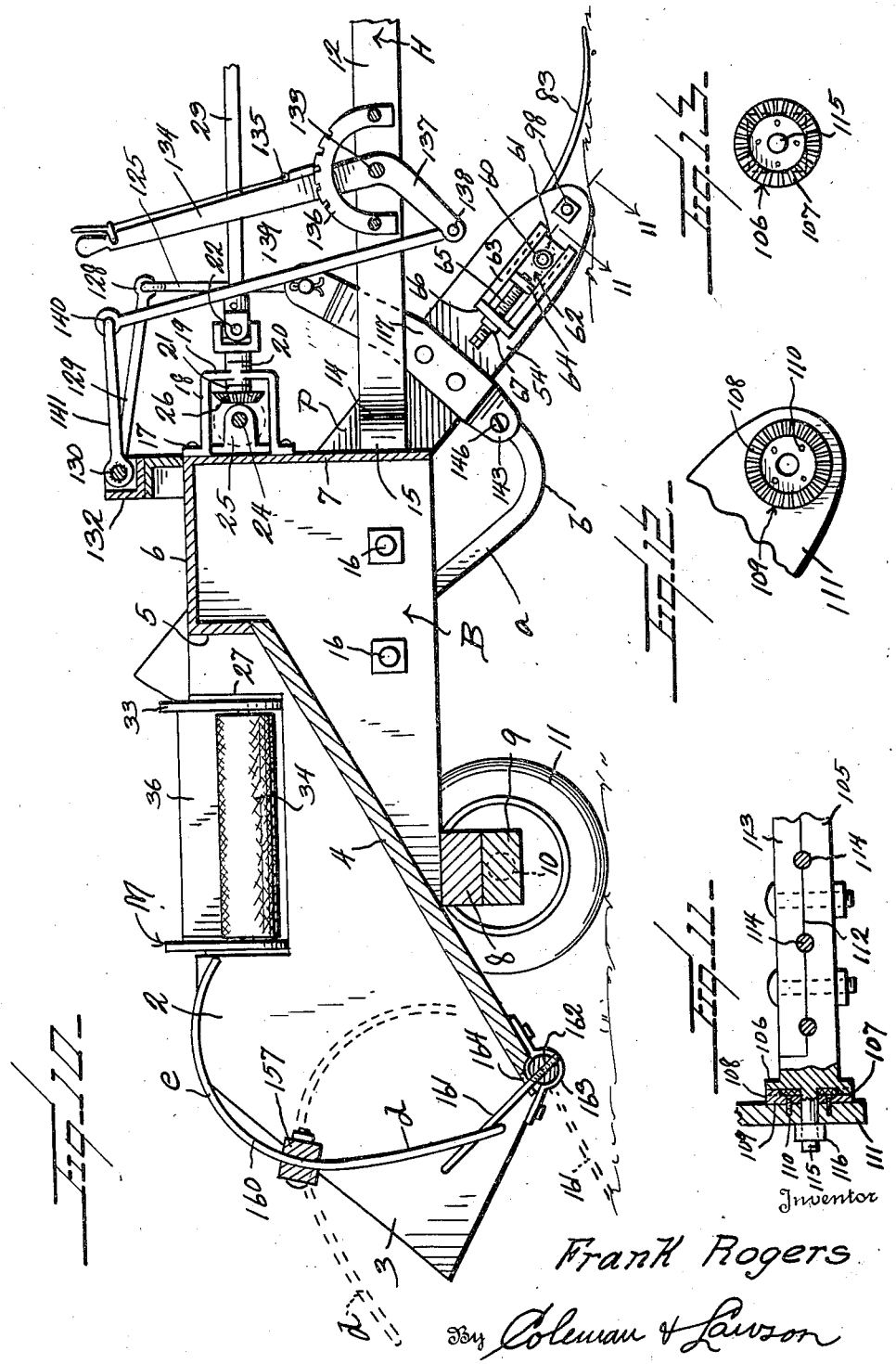

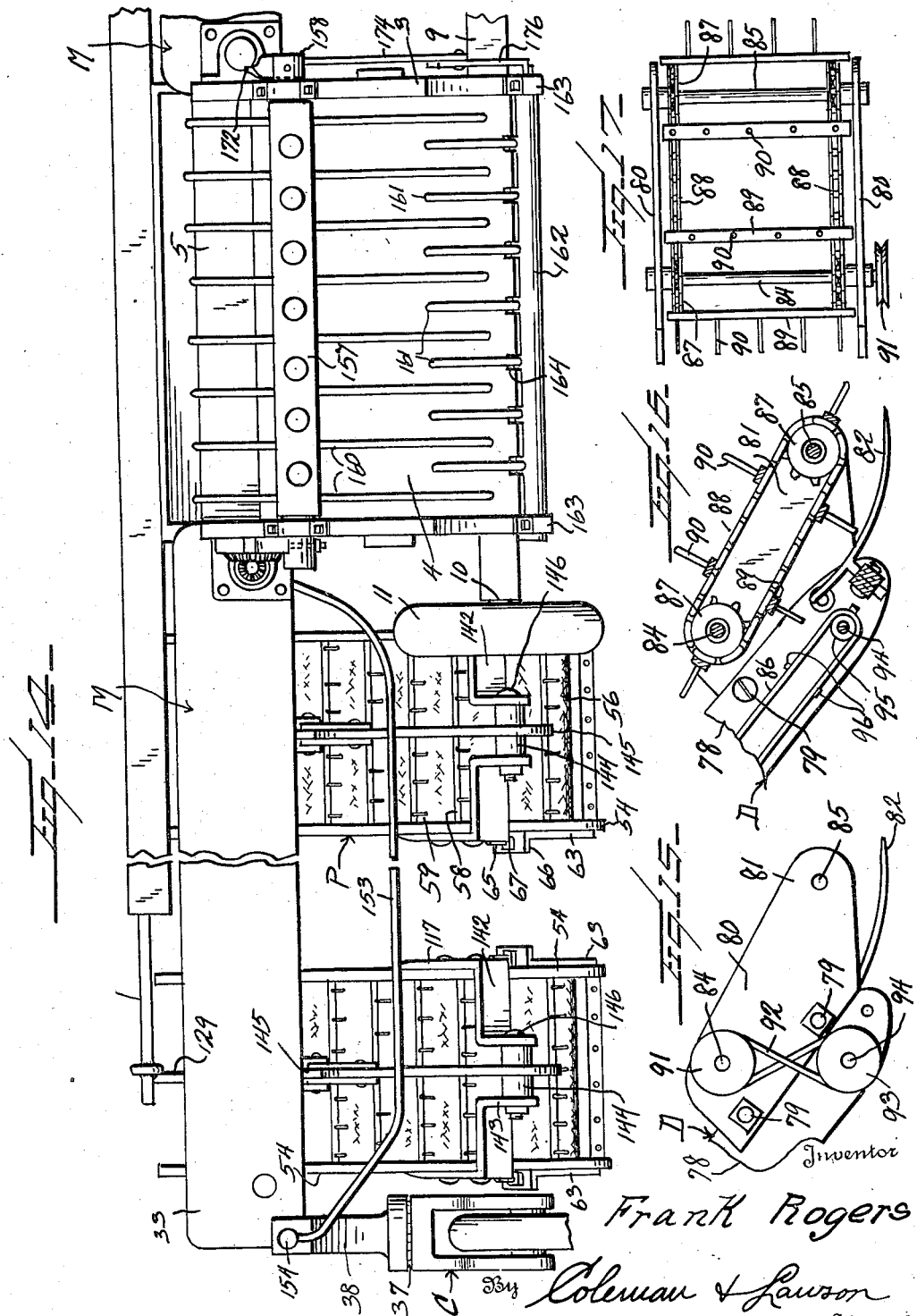

Patented Mar. 7, 1944

2,343,583

UNITED STATES PATENT OFFICE 2,343,583

HARVESTING MACHINE

Frank Rogers, Estancia, N. Mex.

Application June 13, 1942, Serial No. 446,918

12 Claims. (Cl. 56—345)

This invention relates to a harvesting machine, and has relation more particularly to a machine of this kind especially designed and adapted for use in picking up vines or other material to be shocked or windrowed, and which vines or material has previously been cut.

It is a particular object of the invention to provide a machine of this kind of a character to effectively operate on uneven ground, and wherein the vines or other material in a number of rows may be readily picked up and delivered to a common collecting point, and from which point the collected vines or other material may be discharged in shocks or windrows.

The invention also has for an object to provide a machine of this kind adapted to be traversed over a surface from which vines or other material are to be collected, and wherein the machine includes a main conveyor to which delivers a plurality of pick-up conveyors, each independently supported for swinging movement in order to readily compensate for any inequality in the surface over which the machine travels, together with means readily allowing said pick-up conveyors to be raised or lowered.

The invention also has for an object to provide a machine of this kind including a pick-up conveyor supported in a manner whereby the same is free for vertical swinging movement, and wherein means are provided for selectively adjusting the lower or receiving end of such pick-up conveyor with respect to the surface over which the machine travels.

An additional object of the invention is to provide a device of this kind of a portable type and so constructed as to be readily hitched to a tractor or the like and including a series of coacting conveyors operating to pick up and collect the vines or other material from the surface over which the machine travels, and wherein the various conveyors are operated from a single source of power.

An additional object of the invention is to provide a machine of this kind including a main element to which is delivered vines or other material picked up from the surface over which the machine travels, and wherein said element has associated therewith intermittently operated means for allowing the vines or other material delivered to said element to be discharged therefrom in shocks.

The invention consists in the details of construction and in the combination and arrangement of the several parts of my improved harvesting machine whereby certain important advantages are attained, as will be hereinafter more fully set forth.

In order that the invention may be the better understood, I will now proceed to describe the same with reference to the accompanying drawings, wherein:

Figure 2 is a sectional view taken substantially on the line 2—2 of Figure 1, looking in the direction of the arrows;

Figure 3 is a vertical sectional view taken substantially on the line 3—3 of Figure 1, looking in the direction of the arrows;

Figure 4 is a fragmentary detailed sectional view taken substantially on the line 4—4 of Figure 3;

Figure 5 is a vertical sectional view taken substantially on the line 5—5 of Figure 1;

Figure 1:
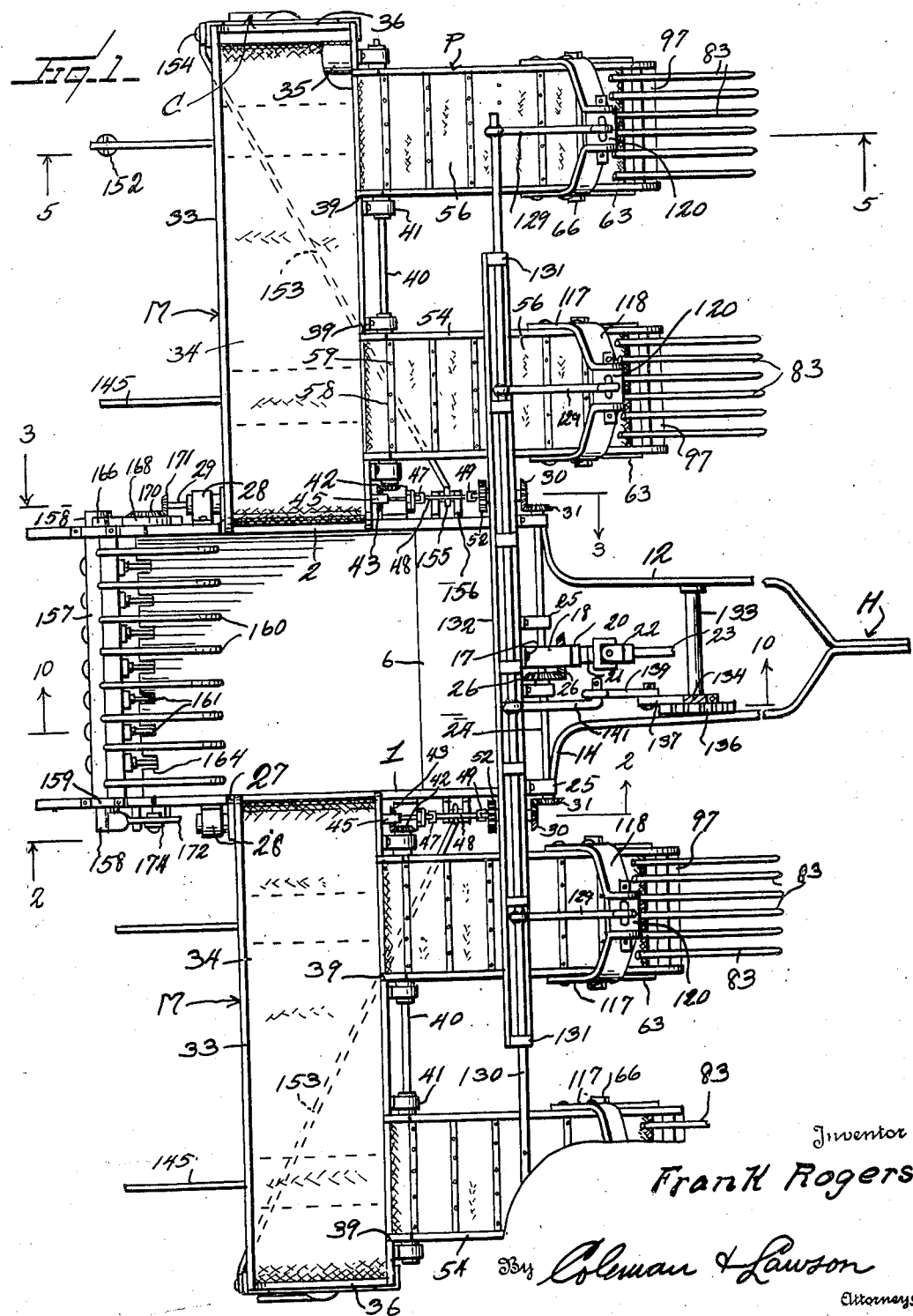
Figure 1 is a view in top plan, with a portion broken away, of a harvesting machine constructed in accordance with an embodiment of my invention, the same being of somewhat a diagrammatic character.

Figure 5ª is a fragmentary view in top plan of the holding member for the pick-up tines as herein comprised, the attaching shanks of the tines being in section;

Figure 6 is a sectional view taken substantially on the line 6—6 of Figure 5;

Figure 7 is a fragmentary detailed sectional view illustrating a slat and associated pick-up finger constructed in accordance with another embodiment of my invention;

Figure 8 is a sectional view taken substantially on the line 8—8 of Figure 7, looking in the direction of the arrows;

Figure 9 is a view in perspective of the pick-up finger illustrated in Figure 7 unapplied;

Figure 10 is a sectional view taken substantially on the line 10—10 of Figure 1, looking in the direction of the arrows;

Figure 11 is a fragmentary view, partly in top plan and partly in section, illustrating a modified form of holding member for the pick-up fingers;

Figure 12 is a fragmentary view in elevation looking at the inner face of the lower end portion of a side member of the frame for the pick-up conveyor as illustrated in Figure 11;

Figure 13 is a view in end elevation of the holding member as illustrated in Figure 11 unapplied;

Figure 14 is an enlarged fragmentary view in rear elevation of the machine as herein embodied;

Figure 15 is a fragmentary view in side elevation illustrating another embodiment of my invention pertaining to the pick-up;

Figure 16 is a vertical sectional view taken through the structure illustrated in Figure 15; and Figure 17 is a view in top plan of the pick-up device illustrated in Figures 15 and 16 unapplied.

As disclosed in the accompanying drawings, B denotes a body member or element including the spaced side walls 1 and 2 of substantially duplicate construction and arranged side or side. The rearward extremities of these side walls 1 and 2 are formed to provide the downwardly and outwardly inclined extensions 3. Interposed between the rear portions of the side walls 1 and 2 and extending along the bottom marginal portions of the extensions 3 is a chute 4 disposed downwardly and rearwardly on a predetermined angle, and preferably on an angle of about thirty degrees. The upper end of this chute 4, as herein disclosed, terminates a distance below the upper edges of the side walls 1 and 2 and at said upper end of the chute 4 the side walls 1 and 2 have interposed therebetween the transversely directed front wall 5 extending from the upper end of the chute 4 to the upper marginal portions of the side walls 1 and 2. The upper marginal portions of the side walls 1 and 2, as disclosed in the accompanying drawings, are connected by the top wall 6 extending from the upper marginal portion of the wall 5 to the front end of the body member or element B. The free ends of the side walls 1 and 2 of the body or element B have interposed therebetween a front head wall 7.

The side walls 1 and 2 of the body or element B have securely fastened to their rear portions the transversely disposed underhung bolster 8, the same being herein disclosed as being closely adjacent to the chute 4. Underlying this bolster 8 and rigidly secured thereto and extending therealong is an axle 9 provided at each extremity with an outstanding trunnion 10 upon which is mounted, in a conventional manner, a ground engaging supporting wheel 11.

Coacting with the forward end portion of the body member or element B is a hitch H whereby the machine may be conveniently coupled to a tractor. This hitch H, as herein disclosed, has its rear portion formed to provide two spaced parallel members 12 having their free end portions laterally and outwardly offset, as at 14, and continued by the arms 15 overlying the outer faces of the side walls 1 and 2 at the lower portions thereof, each of said arms 15 being securely and rigidly held to the side walls 1 and 2 by the holding members 16 of a conventional type.

The front head wall 7 of the body or element B at the top portion thereof has rigidly anchored thereto, as at 17, a forwardly directed bracket 18 herein disclosed as substantially U-shaped in form. This bracket 18 is positioned substantially midway of the side walls 1 and 2 with its intermediate or base member 19 vertically disposed. This base member 19 of the bracket 18 is formed to provide a bearing 20 having a stub shaft 21, said shaft being disposed in a direction lengthwise of the machine. The outer or forward end portion of the stub shaft 21 is connected by a conventional universal coupling 22 with a power shaft 23. This shaft 23 is of a length to extend to and be coupled with the power take-off shaft of the tractor. As this connection or coupling of the shaft 23 with the power take-off of the tractor forms no particular part of the present invention, a detailed description and illustration thereof is believed to be unnecessary.

The member or element B has disposed transversely of its front head wall 7, in advance thereof, a shaft 24 rotatably supported by the suitably positioned and outstanding bearing members 25 rigidly secured to the front head wall 7. This shaft 24 is perpendicularly related to the stub shaft 21 and the shaft 24 is in driven connection with the stub shaft 21 by the coacting beveled gears 26. The side walls 1 and 2 above the upper portion of the chute 4 are provided with the substantially transversely aligned elongated cut-out portions 27, and each of these portions 27 is of considerable depth. The outer faces of the walls 1 and 2, adjacent the ends of the cut-out portions 27, have held thereto the bearings 28 which rotatably support the shafts 29. The forward end portion of each of these shafts 29 carries a beveled gear 30 meshing with a beveled gear 31 fixed to an adjacent end portion of the shaft 24 hereinbefore referred to, whereby the shaft 29 is caused to rotate at desired axial speed. Each of the shafts 29 extends lengthwise across the cut-out portion 27 of the adjacent wall 1 or 2 and fixed to said shaft for rotation therewith is a drive roller 32 for a conveyor M. The conveyor M is of desired length and includes the parallel side portions 33 having their inner end portions extending within a cut-out portion 27 with the inner ends thereof closely adjacent to the end of the cut-out portion. The shaft 29 is freely disposed through said inner end portions of the conveyor M whereby said conveyor is free for swinging movement in a vertical direction with respect to the body member or element B.

The roller 32 is of a length to substantially bridge the space between the side members 33 and disposed around the roller 32 is an endless conveyor belt 34 which is also disposed around a roller 35 rotatably supported between the side members 33 closely adjacent the outer ends thereof. The outer end portions of the side members 33, as herein disclosed, are connected by a transversely disposed strip 36 to assure the maintenance of the side members 33 in desired assembly, and also to provide a mounting for the supporting caster C.

As is particularly illustrated in Figure 5 of the drawings, the caster C is in swiveled connection from below, as at 37, with a bearing bracket 38 secured to the outer end portions of the side members 33 of the conveyor M and depending therefrom.

The forward side member 33 of each of the main conveyors M is provided at spaced points therealong, and herein disclosed as at two points, with the elongated cut-out portions 39 in the upper portion thereof. Extending along this front side member 33 and over the cut-out portions 39 is a shaft 40 herein disclosed as rotatably supported by the bearing members 41 adjacent to the opposite ends of each of the cut-out portions 39. The inner end of this shaft 40 has fixed thereto a pinion 42 meshing with a pinion 43 carried by a stub shaft 44. This shaft 44 is rotatably disposed through a bearing bracket 45 carried by the inner or pivotally mounted end portion of the adjacent side member 33 of the main conveyor M and by a bracket arm 46 extending upwardly from and rigid with a bearing 28 for the shaft 29. In universal connection, as at 47, with the shaft 44 is a shaft section 48 having universal connection, as at 49, with a stub shaft 50 rotatably carried by an outstanding bearing block 51 at the upper rear corner of the adjacent side wall 1 or 2. The shaft 29 hereinbefore referred to is also rotatably disposed through and supported by this block 51, and the shaft 50 carries a pinion 52 meshing with a pinion 53 rotating with the shaft 29 whereby, it is believed to be obvious, the shaft 40 is driven at desired axial speed from the shaft 28.

Extending downwardly and forwardly from each of the main conveyors M are the pick-up conveyors P, there being one of such conveyors P associated with each of the cut-out portions 39. Each of the conveyors P comprises the side members 54 of desired length and arranged side by side with the shaft 40 freely disposed through the upper end portions thereof whereby the conveyor P is freely mounted for up and down swinging movement. These side members M also extend within an adjacent cut-out portion 39 and are spaced apart a distance equal to the length of such cut-out portion. Fixed to rotate with the shaft 40 and positioned between the side members 54 is a roller 55 around which passes an endless conveyor belt 56. This belt also passes around a roller 57 rotatably supported between the lower or outer extremities of the side members 54. The outer surface of this belt 56, at desired points spaced therealong, carries the transversely directed cleats 58. Each of these cleats 58 is provided therealong with the outstanding pick-up fingers 59 of desired length and which possess a certain degree of inherent resiliency. As illustrated in Figures 1, 5 and 14, the cleats 58 are of a type which can be readily made of wood.

The lower roller 57 is fixed to rotate with a shaft 60 disposed axially thereof and which has its extremities disposed through an elongated slot 61 directed lengthwise of the side members 54. Each extremity of the shaft 60 is rotatably supported by a block 62 slidably mounted between the guideways 63 carried by the outer face of each side member 54. By endwise movement being imparted to each of these blocks 62, the belt 56 may be readily tightened or loosened as the requirements of practice may prefer. As is illustrated in Figure 10 of the drawings, each block 62 has in swiveled connection therewith, as at 64, an end portion of a threaded member 65. This member 65 threads through an outstanding part 66 bridging the space between the guideways 63 at the upper extremities thereof. Threading upon this member 65, outwardly of the part 66 and coacting therewith, is a holding nut 67.

In Figures 7, 8 and 9 of the drawings is illustrated a cross cleat for a pick-up conveyor, and wherein such cleat A is made of metal. The cleat comprises two strips 68 of a length substantially equal to the width of the conveyor belt 69. These strips 68 are superimposed one upon the other and have their longitudinal marginal portions provided with the outwardly inclined flanges 70 disposed one toward the other with their outer marginal edges in close contact. Extending upwardly from the cleat A, at points spaced lengthwise thereof, are the resilient pick-up fingers 71, each of which being disposed from below up through a suitably positioned opening 72 in the top strip 68. The lower end of each of the fingers 71 is disposed on a lateral curvature, said curved portion 73 terminating in an extended arm 74 substantially at right angles to the curved portion 73. The curved portion 73 is such as to permit the arm 74 to be tightly clamped between the strips 68. In this embodiment of the invention the superimposed strips 68, at desired points spaced lengthwise thereof, have disposed therethrough the headed members or bolts 75 which are also directed through the belt 69 with the head 76 of each of such members or bolts 75 in contact from below with the inner face of the belt 69. Threading on each of the members or bolts 75 is a nut 77 having direct contact from without upon the outer or top strip 68, whereby sufficient pressure may be imposed upon the superimposed strips 68 to have effective holding contact with the arm 74 of each of the fingers 71.

In Figures 15, 16 and 17 of the drawings is illustrated another embodiment relating to a pick-up. In this form of the invention the lower end portions of the side members 78 of the pick-up conveyor D have bolted, as at 79, to the upper marginal portions thereof the upstanding plates 80. These plates 80 are so formed or designed as to have their lower or forward end portions 81 extended a material distance in advance of the lower end of the side members 78 of the conveyor D and also of a length to extend along the major portion of the pick-up tines 82 which are similar in construction and mounted in substantially the same manner as the pick-up tines 83 in the first embodiment of the invention.

The upper portions of the plate 80 rotatably support the transversely disposed shafts 84 and 85, the upper shaft 84 being a material distance inwardly of the lower end of the conveyor belt 86, while the second or lower shaft 85 is above the outer end portion of the tines 82. These shafts 84 and 85 carry the sprocket wheels 87 which are fixed to the shafts 84 and 85 inwardly of the plates 80 but in close proximity thereto. The sprockets 87 adjacent to each of the plates 80 have disposed therearound and operatively engaged therewith a sprocket chain 88. These chains 88, at desired points spaced therealong, are conected by the cross cleats 89 each of which being provided at spaced points therealong with the outstanding and relatively short pick-up fingers 90. The upper shaft 84 extends outwardly beyond one of the plates 80, and said extended portion carries a pulley 91 around which passes a crossed belt 92 which is also directed around a pulley 93 fixed to an extended end portion of the shaft 94 for the lower drum 95 of the belt 86 of the conveyor D. The belt 86 of the conveyor D is to be driven in the same manner as hereinbefore described with respect to the belt 56 of a conveyor P, and when the belt 86 is in travel the chains 88 will be operated in a manner to cause the lower stretches of said chains 88 to move inwardly and upwardly over the pick-up tines 80 and the lower portion of the belt 86, and said lower stretches of the chains 88 are in such proximity to the tines 82 to assure effective transfer through the medium of the fingers 90 of the vines picked up by the tines 82 to the lower portion of the belt 86, and more particularly the top stretch of said belt 86 which travels upwardly. To facilitate the carrying of the vines delivered to the belt 86 therewith, said belt 86 has secured thereto and disposed across its outer face the cleats 96. In this embodiment of the invention it is not necessary that the cleats 96 be provided with outstanding fingers. It is also to be pointed out that the fingers 90 carried by the cleats 89 are of such length dependent upon the distance between the lower stretches of the chains 88 and the tines 82.

Referring again to the embodiment of the invention as particularly illustrated in Figures 1, 2, 3 and 10, the lower portions of the side members 54 of each of the pick-up conveyors P and at a point below the lower end of the belt 56 have interposed therebetween a bar 97 provided at each end with an outstanding trunnion 98 which is directed through the adjacent side member 54. Threading on this trunnion 98 outwardly of the side member and coacting therewith is a holding or clamping nut 98'.

This bar 97 has its rear portion cut out or recessed, as at 99, said cut-out portion extending substantially from one end of the bar 97 to the other. Substantially snugly fitting within this cut-out or recess 99 is a supplemental bar 100 held to the bar 97 by the headed members or bolts 101 extending through the bars 97 and 100 at points spaced lengthwise thereof, and with which are associated the conventional holding nuts 102. The inner or opposed longitudinal faces of the bars 97 and 100 are provided transversely thereacross with the registering grooves 103. Each set of registering grooves 103 receives a straight shank 104 carried by and depending from the rear portion of a pick-up tine 83. By loosening the clamping action of the bolts 101 and coacting nuts 102, each of the tines 83 can be raised or lowered as desired and effectively maintained in desired adjusted positions by tightening the nuts 102.

As illustrated in Figures 11, 12 and 13, a structure is provided whereby the bars for holding the pick-up tines may be axially adjusted to further regulate or adjust the pick-up tines with respect to the surface over which the machine is traversing. In this embodiment of my invention the main bar 105 is provided at each end with a substantially annular head 106, the outer face of which being toothed, as at 107, for interlocking engagement with the annular series of teeth 108 provided in the outer or opposed face of a plate 109 anchored, as at 110, in proper position at the lower or forward end portion of a side member 111 of the pick-up conveyor.

The bar 105 also has its rear portion cut out or recessed, as at 112, for a distance extending substantially from one end to the other, and in each cut out or recessed portion 112 snugly fits the supplemental bar 113 whereby the shanks 114 of the pick-up tines are effectively clamped or held in applied or working position in substantially the same manner as hereinbefore set forth with respect to the tines 83.

It is believed to be obvious that as the machine advances the vines or material that has previously been cut will be picked up by the tines 82 or 83 and delivered to the lower portions of the associated pick-up conveyors. In the embodiment of the invention as particularly illustrated in Figures 1 and 5, the transfer of the vines from the pick-up tines to the conveyor is facilitated by the pick-up fingers 59 which travel upwardly of and between the rear portions of adjacent tines 83. As illustrated in Figures 15, 16 and 17, the transfer of the vines or material from the tines 82 to the pick-up conveyor is assured by the coaction of the fingers 90.

Again referring to the invention as illustrated in Figures 11, 12 and 13, the bar 105 at each end thereof and at the axial center of the annular series of teeth 107 is provided with an outstanding trunnion 115 which is directed through the adjacent portion of the side member 111 of the pick-up conveyor at a point axially of the series of teeth 108. Threading upon the outer end portion of this trunnion 115 and coacting with the outer face of the adjacent portion of the side member 111 is a holding nut 116. Upon loosening this nut 116 sufficiently it is possible to adjust the bar 105 about its longitudinal axis as desired and, of course, the selected adjustment may be maintained upon tightening the nut 116 which will hold in mesh the teeth 107 and 108.

While I have hereinbefore stated that each end of the bar 105 is provided with the head 106 carrying the teeth 108, it is to be pointed out that the same results can be obtained by providing the same only at one end of the bar 105.

The lower portion of each of the pick-up conveyors P carries at each side thereof the transversely aligned upstanding bracket arms 117, the upper end portions of which being inwardly disposed, as at 118, and terminating in the upstanding spaced and opposed parallel arms 119 positioned at substantially the transverse center of the pick-up conveyor P. Positioned between the arms 119 is a block 120 provided at its opposite ends with the outstanding trunnions 121 which are freely disposed through suitably provided openings 122 whereby the block 120 is supported for rocking movement about an axis disposed transversely of the conveyor P. The trunnions 121, outwardly of the arms 119, have disposed therethrough the retaining pins 123.

The block 120, in its central part, is provided therethrough with an opening 124 through which freely passes the lower end portion of an elongated lifting rod 125. This rod 125 has its lower end portion at all times below the block 120, and threading upon said lower portion of the rod 125 is a nut or stop member 126. It is desirable to have inserted through the extreme lower extremity of the rod 125, below the applied nut or member 126, a cotter pin 127 to prevent complete displacement of this nut or member 126.

The upper end portion of the rod 125 is freely engaged with, as at 128, the outer end portion of a forwardly disposed rock arm 129 fixed to a shaft 130 for rotation therewith. This shaft 130 extends transversely across the forward portion of the body member or element B and extends a sufficient distance beyond opposite sides thereof dependent, or course, upon the number of pick-up conveyors P employed. In the present embodiment of my invention this shaft 130 is rotatably disposed through the supporting bearings 131 suitably secured at desired points along a beam 132 suitably mounted upon the top wall 6 of the body member or element B. This beam 132, as herein disclosed, is of angle formation and extends transversely of the body member or element and for a material distance beyond opposite sides thereof.

Upon requisite rocking movement being given to the shaft 130 all of the rods 125 may be moved upwardly to effect a simultaneous lifting of all of the conveyors or to allow all of such conveyors to be simultaneously lowered. It is to be noted, particularly in Figure 5, that when the conveyors P are in their lowered position the lifting rod 125 associated with each of the conveyors P is in such lowered position to have the nut or stop member 126 thereof spaced below the block 120 sufficient to readily allow the forward or lower end portion of the conveyor P to have unhindered up and down movement as may be effected by unequalities in the ground surface while the machine is in transit.

The spaced parallel members 12 of the hitch H have interposed therebetween and carried thereby a mounting pin 133 with which is pivotally connected the lower end portion of an upstanding lever 134. This lever 134 is positioned closely adjacent to one of the members 12 so that the latch mechanism 135 carried by this lever 134 may have effective coaction with the upstanding holding rack 136 carried by said member 12. The pivotally mounted end portion of the lever 134 carries a depending and rearwardly disposed arm 137 with which is operatively connected, as at 138, the lower end portion of a rod 139. This rod 139 is of desired length and extends upwardly for operative connection, as at 140, with the free end portion of a forwardly disposed rock arm 141 carried by the shaft 130. The operative connection between the lever 134 and the rock arm 141 permits a ready and effective vertical swinging adjustment of the conveyors P while, of course, the coaction of the latch mechanism 135 with the rack 136 permits the conveyors P to be maintained in their selected adjustments.

In the present embodiment of my invention the lower extremities of the bracket arms 117 are provided with the inwardly disposed arms 142 terminating in the depending arms 143 positioned at substantially the transverse center of the conveyor P and spaced apart in a direction transversely thereof. Substantially snugly fitting between the arms 143 is a tubular head 144 carried by an end portion of an elongated balance member 145. The arms 143 carry a pivot bolt or member 146 which bridges the space between the arms 143 and each is also disposed through the tubular head 144 of the balance member 145. This balance member 145, immediately adjacent to its head 146, is of a gooseneck formation, as at $a$, with the low point $b$ thereof downwardly disposed. This gooseneck portion $a$ extends upwardly and is continued by a rearwardly directed substantially straight portion $c$ of considerable length. The balance member 145, at substantially the junction of the portions $a$ and $c$ thereof, has pivotally connected therewith, as at 147, the lower end portion of a link 148 pivotally connected to, as at 149, and depending from a bracket 150 secured to an adjacent side member 33 of a main conveyor M.

The rear or free end extremity of the portion $c$ of the balance member 145 is provided with a series of longitudinally spaced openings 151 to allow a selected placement of a weighted member or poise 152. This member 145 with its associated member or poise 152 allows for an effective balancing of its associated conveyor P. This is of advantage as the desired lifting of the conveyor P will be materially facilitated. In this connection it is to be particularly stated that the weight or poise 152 should be such to just let the lower or forward end portions of the side members 54 of the conveyor P touch the ground surface.

It is also of importance to provide means whereby each of the main conveyors M may be braced against forward and backward pressure when the machine is in motion, and yet permit said main conveyors to freely move up and down. As comprised in the invention as herein embodied, each of the main conveyors M has associated therewith a brace rod 153. One extremity of this rod 153 is anchored, as at 154, to the outer lower portion of the rear side member 33 of the conveyor M and is extended diagonally across and under the conveyor M with the inner extremity pivotally connected, as at 155, with a bracket 156 carried by and extending outwardly from the upper forward portion of a side wall 1 or 2. This bracket 156, as particularly illustrated in Figures 2 and 3 of the drawings, also constitutes a supporting bearing for a shaft 29.

When the discharge from the chute 4 is unhindered the harvested vines will be delivered in windrows, but it is a purpose of the present invention to provide means whereby such collected vines may be delivered in shocks. Interposed between the upper margins of the rear extensions 3 of the side walls 1 and 2 is a bar 157, said bar substantially bridging the space between the side walls 1 and 2, and each extremity of this bar is provided with an outstanding trunnion 158 rotatably held, as at 159, to an extension 3 of the wall 1 or 2, whereby the bar 157 is supported for rocking movement. The bar 157 has disposed therethrough, at predetermined points therealong, the tines 160, the portion $d$ of each of said tines below the bar 157 being substantially straight, while the portion $e$ of each tine above said bar 157 being disposed on an upward and rearward curvature. The upper portion $e$ of the tine is of a length to closely approach the adjacent main conveyor M when said portion $e$ of the tine 160 is in its uppermost position and to closely approach the bottom portion of the chute 4 when said portion $e$ of the tine 160 is in its lowermost position, as illustrated by broken lines in Figure 10. The portion $d$ of each of the tines 160, as also illustrated in Figure 10, is of a length to closely approach the lower end of the chute 4 when the portion $e$ of the tine is in its uppermost position. As the portion $e$ of the tine 160 swings downwardly, the portion $d$ swings upwardly and rearwardly.

When the portions $d$ of the tines 160 are in their lowermost position they extend between upwardly and rearwardly inclined tines 161 carried by a bar 162 rotatably supported, as at 163, by the chute 4 at the lower extremity thereof. Each of the tines 161 when at the limit of its upward movement is received within a suitably positioned recess 164 provided in the lower marginal portion of the chute 4.

One of the trunnions 158 of the bar 157 extends outwardly beyond the side wall 2 of the body member or element B, and said extended portion of the trunnion 158 has detachably held thereto, as at 165, a trip lug 166 which extends out radially from said trunnion 158. When the portions $d$ of the tines 160 carried by the bar 157 are in their lowered positions the lug 166 is at substantially the vertical center and disposed upwardly from the trunnion 158, such position being effected by contact from below with said lug 166 of one of the trip lugs 167 carried by and outwardly disposed radially of a member 168 rotatably supported, as at 169, by the side wall 2. This rotatable member 168, as herein embodied, carries a face gear 170 with which meshes a pinion 171 carried by the adjacent extremity of the shaft 29 hereinbefore referred to. The ratio of the face gear 170 and the pinion 171 is to be as desired, and in the present embodiment of my invention the member 168 carries two trip lugs 167 which are radially aligned. There can, however, be used if desired a single lug 167 or more than two of such lugs, dependent upon the number of trips desired to be given to the tines 160 within a predetermined time.

The second trunnion 158 extends outwardly beyond the side wall 1 of the body member or element B and said extended portion of the second trunnion 158 carries a forwardly directed rock arm 172 with which is pivotally connected, as at 173, the upper end portion of a rigid elongated link 174. This link 174 depends from the rock arm 172 and has its lower end portion pivotally connected, as at 175, to an upstanding rock arm 176 carried by an end portion of the bar 162. As particularly illustrated in Figure 2, the rock arms 172 and 176 are provided with the longitudinally spaced openings 177 whereby the pivotal connection of the link 174 with said rock arms 172 and 176 may be selectively adjusted in accordance with the desired rocking or turning movement to effect the requisite turning of the bar 162 and resultant lowering or raising of the tines 161.

The link 174 is constantly urged downwardly by a retractile coil spring 178, said spring, as illustrated in Figure 2, having one end portion secured, as at 179, to the upper portion of the link 174 while the opposite extremity of the spring 178 is anchored, as at 180, to the lower portion of the side wall 1 at a point closely adjacent to the bar 162. This spring 178, by its coaction with the link 174, serves to automatically throw the tines 161 downwardly and to raise the portions d of the tines 160, as illustrated by broken lines in Figure 10 of the drawings. As the member 168 rotates the lugs 167 coact with the lug 166 to intermittently raise the tines 161 and lower the portions d of the tines 160, and as each of the lugs 167 passes free of the lug 166 the spring 178 reverses such positions of the tines. By this means it is believed to be apparent that the vines as gathered and delivered upon the chute 4 may be discharged at intervals from the chute 4 in bundles or shocks. It is also believed to be obvious that when it is desired to discharge the gathered vines and the like in windrows from the chute 4 the bars 157 and 162 with their tines 160 and 161, respectively, can be readily removed.

It is also to be pointed out that the efficiency of the machine as herein comprised is increased by having the side members 54 of the pick-up conveyor P of a length to ride upon the ground surface, as is clearly indicated in Figures 5 and 10 of the drawings.

From the foregoing description it is thought to be obvious that a harvesting machine constructed in accordance with my invention is particularly well adapted for use by reason of the convenience and facility with which it may be assembled and operated.

I claim:

1. A machine of the class described comprising a portable body, a pick-up conveyor associated with the body, means for mounting the pick-up conveyor for swinging movement in a vertical direction, upstanding bracket arms carried by the lower portion of the conveyor and spaced apart transversely thereof, a block pivotally supported between the upper portions of the arms, a rod freely disposed from above through the block, a member on the rod below the block for contact with the block from below to raise the conveyor when the rod is lifted, and means carried by the body and operatively engaged with the rod for raising and lowering said rod.

2. A machine of the class described comprising a portable body, a pick-up conveyor associated with the body, means for mounting the pick-up conveyor for swinging movement in a vertical direction, upstanding bracket arms carried by the lower portion of the conveyor and spaced apart transversely thereof, a block pivotally supported between the upper portions of the arms, a rod freely disposed from above through the block, a member on the rod below the block for contact with the block from below to raise the conveyor when the rod is lifted, and means carried by the body and operatively engaged with the rod for raising and lowering said rod, said rod when at the limit of its downward movement positioning the member thereon at a point spaced below the block to allow the conveyor to have limited up and down swinging movement independently of the rod.

3. A machine of the class described comprising a portable body, a pick-up conveyor carried thereby, said pick-up conveyor including side members adapted to ride upon the ground surface, a cross bar carried by the lower extremities of said side members, pick-up tines above said bar and extending forwardly and rearwardly of the bar, shanks depending from the tines, and means coacting with the bar and the shanks for clamping the shanks to the bar to maintain the pick-up tines in working position, the shanks of the tines permitting the tines to be adjusted toward or from the bar.

4. A machine of the class described comprising a portable body, a pick-up conveyor including side members, means for connecting the pick-up conveyor to the body to allow the pick-up conveyor to have swinging movement in a vertical direction, means for raising or lowering the conveyor, balancing means for the conveyor carried by the body, said balancing means including an elongated member underlying the body and the conveyor, means for pivotally connecting the central portion of said member with the body, means for pivotally connecting one end portion of the member with the conveyor, and a weighted member carried by the opposite end portion of the first member.

5. A machine of the class described comprising a portable body, a pick-up conveyor carried thereby and including side members, the forward extremities of the side members being adapted to ride upon the ground surface, a bar interposed between the outer end portions of said side members and rotatably supported thereby, coacting means carried by the bar and one of the side members of the conveyor for holding the bar in a selected rotary adjustment, and pick-up tines carried by the bar and extending in advance of the conveyor.

6. A machine of the class described comprising a portable body, a pick-up conveyor carried by the body and extending downwardly and forwardly therefrom, said conveyor delivering to the body, pick-up tines carried by the lower portion of the conveyor and extending in advance thereof, a pick-up mechanism carried by the lower portion of the conveyor above the tines and the adjacent portion of the conveyor, said pick-up mechanism including an endless carrier, outstanding fingers carried by the carrier, and means for moving the carrier to cause the fingers to transfer material picked up by the tines to the conveyor.

7. A machine of the class described comprising a portable body, a main conveyor extending laterally therefrom and delivering thereto, a plurality of pick-up conveyors extending forwardly and downwardly from the main conveyor at points spaced lengthwise thereof, means for connecting each of said pick-up conveyors to the main conveyor for swinging movement in a vertical direction, and means for simultaneously raising and lowering the pick-up conveyors, said means being so constructed and arranged to permit each of the pick-up conveyors, when the conveyor is in its lowermost position, to have limited up and down swinging movement independently of said means and of the remainder of the pick-up conveyors.

8. A machine of the class described comprising a portable body, a main conveyor to deliver to the body, said conveyor extending laterally from the body, means for connecting one end portion of the conveyor to the body, a ground engaging member carried by the opposite end portion of the body, a pick-up conveyor associated with the main conveyor and extending forwardly and downwardly therefrom, a brace rod underlying the conveyor and extending diagonally thereacross, means for connecting one end portion of said rod to the upper forward portion of the main conveyor, and means for pivotally connecting the opposite end portion of said brace rod to the body.

9. A machine of the class described comprising a portable body including a downwardly and rearwardly disposed chute, means carried by the body for picking up cut vines or the like and delivering the same upon the chute, a bar rotatably carried by the body at the lower extremity of the chute and extending transversely of the chute, outstanding tines carried by said bar at points spaced therealong, a second bar rotatably supported by the body above the lower or discharge end of the chute, tines carried by said second bar at points spaced therealong, said tines extending above and below the second bar, an operative connection between the two bars to cause said bars to rotate in unison, with the lower portions of the tines of the second bar being in their lowermost positions when the tines of the first bar are in their uppermost positions, and means for intermittently rocking said bars.

10. A machine of the class described comprising a portable body including a downwardly and rearwardly disposed chute, means carried by the body for picking up cut vines or the like and delivering the same upon the chute, a bar rotatably carried by the body at the lower extremity of the chute and extending transversely of the chute, outstanding tines carried by said bar at points spaced therealong, a second bar rotatably supported by the body above the lower or discharge end of the chute, tines carried by said second bar at points spaced therealong, said tines extending above and below the second bar, an operative connection between the two bars to cause said bars to rotate in unison, with the lower portion of the tines of the second bar being in their lowermost positions when the tines of the first bar are in their uppermost positions, means for constantly urging the bars to rotate in one direction, and trip operated means for rotating said bars in the opposite direction.

11. A machine of the class described comprising a portable body, main conveyors extending laterally and outwardly from the body at opposite sides thereof, said conveyors each including a belt having its upper stretch moving inwardly toward the body, ground engaging members carried by the outer end portions of the main conveyors, pick-up conveyors extending forwardly and downwardly from the main conveyor and at points spaced longitudinally thereof, means for pivotally connecting said pick-up conveyors to the main conveyors for up and down swinging movement, each of said pick-up conveyors including an endless belt supported free of the main conveyor having an upper stretch traveling upwardly and rearwardly for discharge upon the upper stretch of the belt of a main conveyor, and means carried by the body and common to the belts of the main conveyors and the belts of the pick-up conveyors for operating the same.

12. A machine of the class described comprising a portable body, main conveyors extending laterally and outwardly from the body at opposite sides thereof, said conveyors each including a belt having its upper stretch moving inwardly toward the body, ground engaging members carried by the outer end portions of the main conveyors, pick-up conveyors extending forwardly and downwardly from the main conveyors, means for pivotally connecting said pick-up conveyors to the main conveyor for up and down swinging movement, each of said pick-up conveyors including an endless belt having an upper stretch traveling upwardly and rearwardly for discharge upon the upper stretch of the belt of a main conveyor, means for operating the belts of the main conveyors and the pick-up conveyors, a rock shaft carried by the body and extending beyond opposite sides thereof and above the pick-up conveyors, a rock arm carried by said rock shaft above each of the pick-up conveyors, a lifting rod depending from each of the rock arms, an operative connection between said lifting rod and the pick-up conveyor therebelow, and means for rocking the rock shaft.

FRANK ROGERS.